(12) United States Patent
Britton et al.

(10) Patent No.: US 6,422,655 B1
(45) Date of Patent: Jul. 23, 2002

(54) TIRE INSIDE NOISE ABSORBER

(75) Inventors: J. Daniel Britton, Charlotte, NC (US);
Thomas Anthony Janello, Fort Mill, SC (US); Mehmet Sadettin Fidan, Garbsen (DE)

(73) Assignee: Continental General Tire, Inc., Charlotte, NC (US)

(*) Notice: Subject to any disclaimer, the term of this patent is extended or adjusted under 35 U.S.C. 154(b) by 0 days.

(21) Appl. No.: 09/693,572

(22) Filed: Oct. 20, 2000

Related U.S. Application Data

(60) Provisional application No. 60/165,156, filed on Nov. 12, 1999.

(51) Int. Cl.[7] .................. B60B 19/00; B60B 37/00; B60C 23/18; F16H 55/14

(52) U.S. Cl. .................. 301/6.91; 152/153; 74/443

(58) Field of Search .................. 74/443; 152/110.1, 152/153, 209.4, 209.6, 209.7, 311, 339.1, 450; 295/7; 301/5.21, 5.22, 6.91 I; 139/391, 399; 428/85, 92, 94, 95

(56) References Cited

U.S. PATENT DOCUMENTS

| | | | | |
|---|---|---|---|---|
| 2,185,398 A | * | 1/1940 | Brunswick | 152/153 |
| 2,226,453 A | * | 12/1940 | Vretman | 152/339.1 |
| 2,815,558 A | * | 12/1957 | Bartovics et al. | 139/399 |
| 3,047,285 A | * | 7/1962 | Gross | 152/153 |
| 3,115,436 A | * | 12/1963 | Bloch et al. | 139/391 |
| 3,716,078 A | * | 2/1973 | Clark | 139/399 |
| 4,381,026 A | * | 4/1983 | Skidmore | 152/153 |
| 4,392,522 A | * | 7/1983 | Bschorr | 152/450 |
| 4,399,851 A | * | 8/1983 | Bschorr | 295/7 |
| 4,404,999 A | * | 9/1983 | Woodall, Jr. et al. | 139/391 |
| 4,406,310 A | * | 9/1983 | Reader et al. | 139/391 |
| 4,755,006 A | * | 7/1988 | Clay et al. | 301/5.22 |
| 5,479,974 A | * | 1/1996 | Noggle et al. | 152/450 |

FOREIGN PATENT DOCUMENTS

| | | | |
|---|---|---|---|
| DE | 4325470 A1 | * | 2/1995 |
| DE | 4120878 C2 | * | 4/1996 |

* cited by examiner

Primary Examiner—S. Joseph Morano
Assistant Examiner—Jason R. Bellinger
(74) Attorney, Agent, or Firm—Calfee, Halter & Griswold LLP

(57) ABSTRACT

A sound absorber for insertion into a pneumatic tire is composed of a support strip attached to the rim of the wheel on which the tire is mounted and a system or network of flexible fibers attached to the mounting strip and extending in the radial direction of the tire.

18 Claims, 3 Drawing Sheets

TIRE INSIDE NOISE ABSORBER

Related Applications

This application claims priority to provisional application Ser. No. 60/165,156, filed Nov. 12, 1999.

BACKGROUND

1. Field of Invention

The present invention relates to a sound-reducing device for insertion inside a pneumatic tire.

2. Background

The radiation of sound from a motor vehicle tire, in addition to wind and engine noises, contributes to the overall sound emission of a motor vehicle to a relatively great extent. One of the causes of this is the running noise that comes from the impact of tire's running surface on the surface of the roadway. The configuration of the tire profile has a significant influence on this. In this connection, several measures are already known to reduce tire noise by changing the pitch cycles of the tire's running surface. These changes bring about a redistribution of the vibrations of the tire into a broader frequency band. This, in turn, reduces the so-called vibration "peaks" in the audible range and hence a reduction in audible noise. As in the case of noise-reducing rubber mixtures, the difficulties which have resulted from this approach lie in the particular influence which the running strip profile has on the driving characteristics of the motor vehicle.

Further developments involve absorbing the noise that arises upon the movement or the rolling of the tires, to the greatest extent possible, within the immediate vicinity of the area of its origination, such as by placing sound-absorbing devices in the wheel casing of the motor vehicle, for example. Here, too, the additional expense and the changes in the body of the vehicle are to be noted as disadvantages.

One additional cause of noise lies in the vibrations of the running strip and of the side walls of a rotating motor vehicle tire which, upon leaving the standing surface of the wheel, oscillate in their natural oscillational forms. The natural oscillational forms of the belt are also more noticeable here. Here, measures for the reinforcement of the side walls or for the connection of both side walls within the pneumatic tire by means of support braces are already known in this connection.

All of these vibrations are transmitted to the air column within the interior of the tire which, in turn, passes them on to a not-insignificant extent. Moreover, through formation of stationary waves and the reaching of certain natural oscillation frequencies, these vibrations can be amplified even more and fed back into the components of the tire.

The placement of foam material rings in the torus space, or even the filling out of the torus space with sound-absorbing material is likewise known. See German Patent No. DE 43 25 470 A1, for example. This approach not only makes mounting of the tires more difficult, but also increases overall weight. Moreover, because of the non-uniform way in which the torus space may be filled, considerable problems are encountered regarding balancing of the wheels at high speeds.

German Patent No. DE 41 20 878 C2, on the other hand, describes a motor vehicle tire in which reinforcements are connected to opposing side walls on the interior of the tire in a force locking manner. In particular, these reinforcements are vulcanized to the inner sides of the tire side walls by way of ring-shaped bands. By means of this arrangement, the vibrations of the side walls as well as the transmission of these vibrations to the air column in the interior of the tire are damped. These reinforcements, which are uniform in terms of radial shape as well as placement along the circumference of the tire are capable of vibration and act in a damping manner. However, they also form natural vibrations. In addition, only the vibrations of the side wall are influenced, but not the vibrations of the running strip and of the belt.

U.S. Pat. No. 5,479,974 presents a noise-reducing system for tires with flexible, non-self-supporting flaps attached to the rim, which are preferably made from textile materials which are moved, by means of centrifugal force, in the radial direction and subdivide the interior of the tire into several chambers. By this means, vibrations in the interior of the tire should also be damped, and a change of the wavelength or of the amplitude during the stationary waves of the air column which are formed should be brought about.

The provision of the large-surface flaps, which are not stable, particularly at lower driving speeds, as well as the possibility of a "fluttering" or "striking" or a vibration of the body into transitional speeds between a stable and an unstable position, which directly leads, through the relatively great mass of the individual elements (flaps), to the bringing about of additional noises, is disadvantageous in this arrangement.

The task of the invention has thus been that of absorbing the vibrations of the air column located in all of the tires, in all conditions of driving, but without creating, through the assembly units, an additional strongly vibrating system, and without influencing the driving characteristics and the construction of the tire component or the body of the vehicle in an unfavorable manner.

SUMMARY OF THE INVENTION

The sound absorber of the present invention is comprised of a web or system of flexible fibers which is connected with a strip-shaped support fabric, in which the support fabric is attached, with its internal side turned away from the web, to the external side of the bead of the rim, and the fibers of the web extend, inside the hollow space which is formed between the rim and the tire in the radial direction.

Such a sound-absorbing assembly has a very slight mass or a slight weight, as the result of which the centrifugal forces which are brought about are kept very low, even at a high rotational speed of the wheel, and no markedly increased stressing of construction parts, such as bearings, wheel supports, stabilizers, etc., is brought about. Through the flexible development of the fibers, in addition, a problem-free mounting of the tire on the rim is possible, since the tire bead simply slides over the fibers, and can be displaced to the opposite rim seat.

Furthermore, such a sound-absorbing assembly, consisting of fibers extending radially inside the hollow space which is formed between the rim and the tire, has an extraordinarily high absorption capacity over a very wide frequency band. In this, the particularly high-intensity components of a sound field are absorbed independently of the frequency. The individual fibers, which are positioned densely against one another and extend in a radial direction, thereby form an absorption body which not only acts in a strong damping manner, but also impedes, to the greatest extent possible, the formation of stationary waves.

DETAILED DESCRIPTION

The width of the support fabric strip of the inventive absorber can be formed in any manner desired and thus, for example, also extends over the entire free width of the rim between the tire beads, although it preferably occupies only a fraction of the width of the rim, however, since a simpler mounting is made possible by that means.

One particularly advantageous development of the sound-absorbing assembly consists of the fact that the fibers of the web are formed as non-self-supporting fiber which, upon the rotation of the motor vehicle wheel, are moved in the radial direction under the influence of the centrifugal force inside the hollow space that is formed between the rim and the tire.

Through such a development, the mounting is not only first of all simplified, since the non-self-supporting fibers are applied to the rim without the influence of centrifugal force or under the influence of gravity, and thereby occupy a position of equilibrium, and are not, for example, set against any kind of resistance to a tire to be drawn onto the rim, which tire is, in point of fact, moved with its tire beads through the drop base. In addition, any materials can be used for fibers in such an implementation, particularly such as are formed to be particularly soft or elastic and, for this reason, have increased absorption characteristics if they are brought under the influence of centrifugal force.

One additional advantageous development consists of the fact that fibers of the web and/or the fibers of the support fabric consist of several individual filaments, or bundles of filaments, which are interwoven or stranded with one another, if necessary.

In this, the filaments of the web fibers are, in particular, interwoven or stranded in a loose bond, in such a manner that the individual filaments do not touch one another over the entire length of the fiber, as the result of which openings or hollow spaces arise within the stranded or interwoven material and the filament bond which forms the specific fiber, through which the ability to absorb is further increased. One further effect which results from this is that these openings or hollow spaces are closed again when the centrifugal force becomes stronger, as the result of which an adjustment of the absorption capacity is made possible in dependence on the rotational speed of the wheel.

In this manner, the fibers of the web cannot only be adjusted in their elasticity, but can also be formed from individual filaments of different materials with adjusted absorption/damping characteristics. This advantage also results for the support fabric, whereby the strength or the extensibility of the support fabric can also be further adjusted.

One further advantageous development consists of the fact that the individual fibers and/or filaments of the web are formed, at least in part, as spatially-formed fibers or filaments, particularly as fibers or filaments formed in a undulating or helical manner. The noise absorption capacity of the web is, first of all, further increased through such a development. This is brought about through material fibers which are longer overall resulting in more damping material made available through the spatial deformation. Such a construction also provides an increased and more strongly diffused reflection of the sound waves by such an undulating or helical twisting or torsion, through which the development of stationary waves is made still more difficult.

These effects can be amplified still further through an additional advantageous development in which the individual fibers of the web are interwoven or interlaced with one another in a loose connection.

The fibers of the web and/or the fibers of the support fabric are, in an advantageous manner, formed as synthetic fibers, preferably as polyamide, polyester, polyvinyl-alcohol (PVA), aramide, carbon, or glass fibers. Through the use of such materials, as well as through the use of mixed materials, if necessary, an influence can be brought about on the absorption ability of the sound-absorbing assembly, depending on the design. The use of hollow fibers is thereby also advantageous in regard to the absorption capacity.

In one additional advantageous development, the support fabric is formed as a closed annular strip, whereby the fibers of the support fabric consist, at least partially, of a shrinkable material. The sound-absorbing assembly can thereby be produced as a pre-manufactured ring with such an excess dimension that it can easily be slid over the horns of the rim, and can thereupon be fixed to the rim in its end position by means of a shrinking process, such as by means of water-shrinkable or heat-shrinkable threads or filaments, for example, through which an adhesion or further fixing can be dispensed with.

The support fabric can, of course, also be glued on its internal side to the radial external side of the rim, whereby an overlapping area freed from the web is preferably provided in order to connect the ends of the support fabric strip. The support fabric strip can, during the formation of such an overlapping area, and specifically depending on the centrifugal forces or rotational speeds which are to be expected, likewise be tightened around the radial external side of the rim, whereby only the ends of the support fabric are then glued to one another.

One further possibility consists of creating the support fabric strip in the form of closed, ring-shaped strips, whereby the support fabric material has elasticity such that it can be additionally lifted over the horns of the rim relatively easily, and then elastically tightened onto the rim by means of resilience.

The support fabric is advantageously coated, at least on its internal side, with sound-damping material, preferably with layers of foam or rubber. By this means, a damping of the vibrations of the body of the rim is brought about, in addition to the absorption of noise through the web fibers within the torus space. This results in making the transmission of vibrations within the torus space even more difficult.

Both the web fibers, as well as the fibers of the support fabric, can thereby be formed as fibers with a high modulus of elasticity and high temperature resistance. These fibers provide high damping capability, a secured fixing to the rim and secure sound absorption, even upon the heating of the tire or the parts of the tire or of the torus space.

One additional advantageous development consists of the fact that the support fabric is connected with the tire bead, on at least one side, in the area of the bead profile or in the area of the rim seat. By means of such a development, the tire and the support fabric with its web can be mounted to the rim in one work process, whereby the use of shrinkable fibers for the support fabric is appropriate in the event of a connection to one side only, through which a one-sided clamping in the area of the bead and a shrinking down of the remaining width of the support fabric strip are carried out on the radial external side of the rim. In the event of a two-sided connection, the support fabric strip covers over the entire width of the rim and is clamped to both sides, in the area of the rim seat, by the tire bead, whereby the use of shrinkable fibers for the support fabric is appropriate for a shrinking down over the entire width of the rim here as well.

One additional advantageous development consists of the fact that the web fibers are formed in different lengths over individual areas of circumference of the rim. If, for example, areas of the sound-absorbing assembly, with web fibers longer in relation to the remaining areas, are symmetrically distributed at angular distances over the circumference of the rim of 60° or 30°, then the absorption capacity is further increased in relation to the circumferential sound waves which are brought about within the torus space.

BRIEF DESCRIPTION OF THE DRAWINGS

The invention will now be illustrated in further detail by means of exemplary embodiments depicted in the following figures.

DESCRIPTION OF EXEMPLARY EMBODIMENTS

Figure 1:
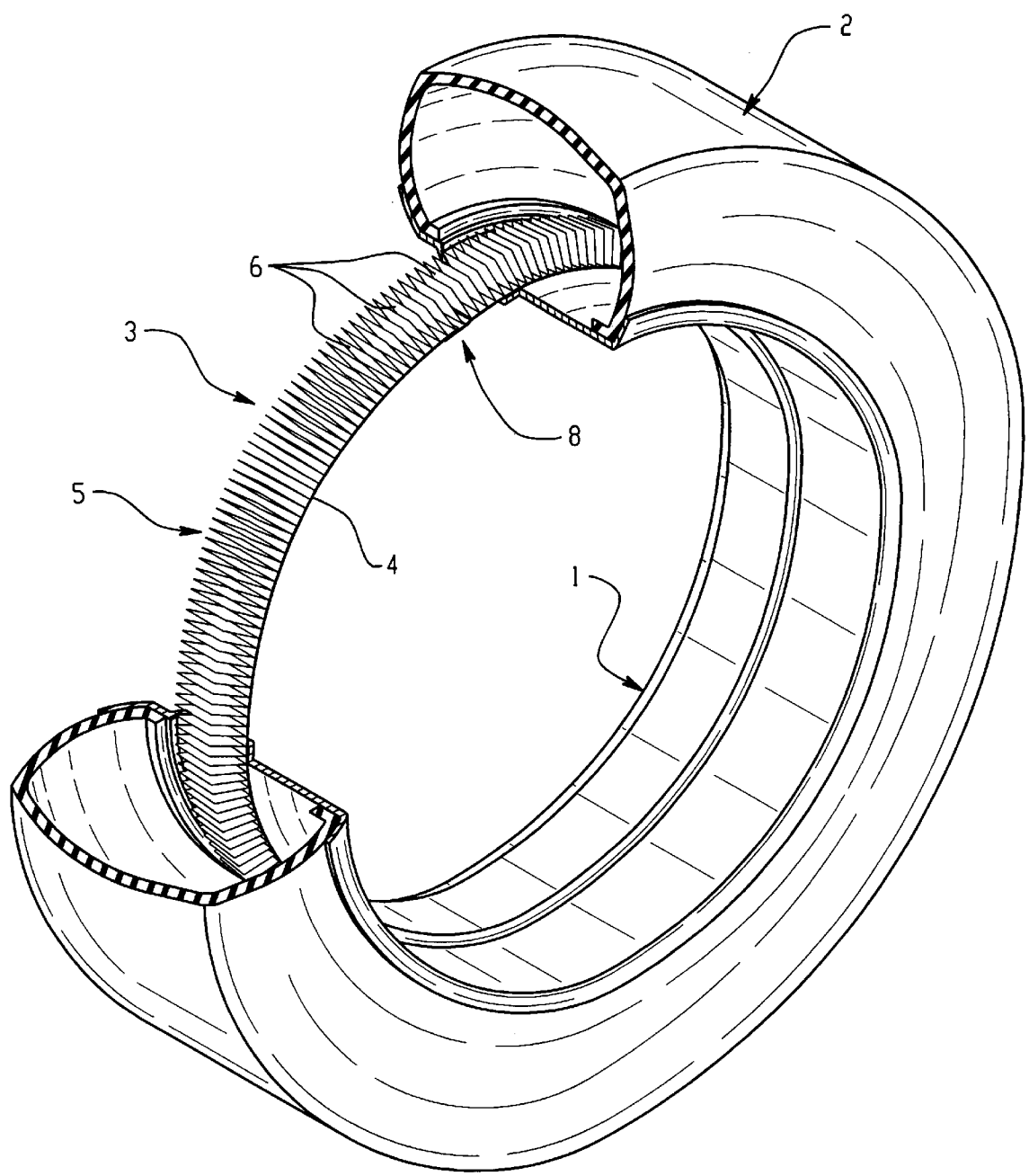
FIG. 1 illustrates a sound-absorbing assembly in accordance with the invention, inside the tire of a motor vehicle.

FIG. 1 depicts a motor vehicle tire 2 drawn onto a standard rim 1, whereby the disk of the rim is, for the sake of greater clarity—not depicted here.

A sound-absorbing assembly 3, which consists of a strip-shaped support fabric 4, which is connected with a web 5 of flexible fibers 6, is attached to the outer side of the standard rim 1. The width of the support fabric 4 thereby occupies only a fraction of the width of the rim.

As shown in FIG. 1, the fibers are arranged in the manner of a synthetic fur or conventional pile carpet. In other words, each fiber is attached at one end to the support fabric 4 and is not otherwise attached to the support or the other fibers. In addition, the fibers are relatively densely packed. In one embodiment, as further discussed below, the fibers are non-self-supporting as in the case of conventional deep-pile carpet. In this embodiment, the fibers extend in the radial direction of the tire in response to the centrifugal force set up when the tire rotates. In another embodiment, the fibers are sufficiently self-supporting to extend in the radial direction, even when the tire is at rest. In this embodiment, the fibers are arranged in a manner similar to synthetic for conventional pile fibers.

FIG. 1 depicts the condition which results from the influence of centrifugal force on non-self-supporting fiber; that is to say, during the rotation of the rim and the pneumatic tire. The fibers 6 of the web 5 are thereby formed as non-self-supporting polyester fibers which, upon the rotation of the motor vehicle wheel, are moved in the radial direction (i.e., in the direction from hub to tread), under the influence of centrifugal force, inside the hollow space which is formed between the rim and the tire. The fibers 6 of the web 5 upon standing still are applied, under the influence of gravity, to the support fabric 4, or to the rim, or are else suspended in the lower area within the hollow space.

Figure 2:
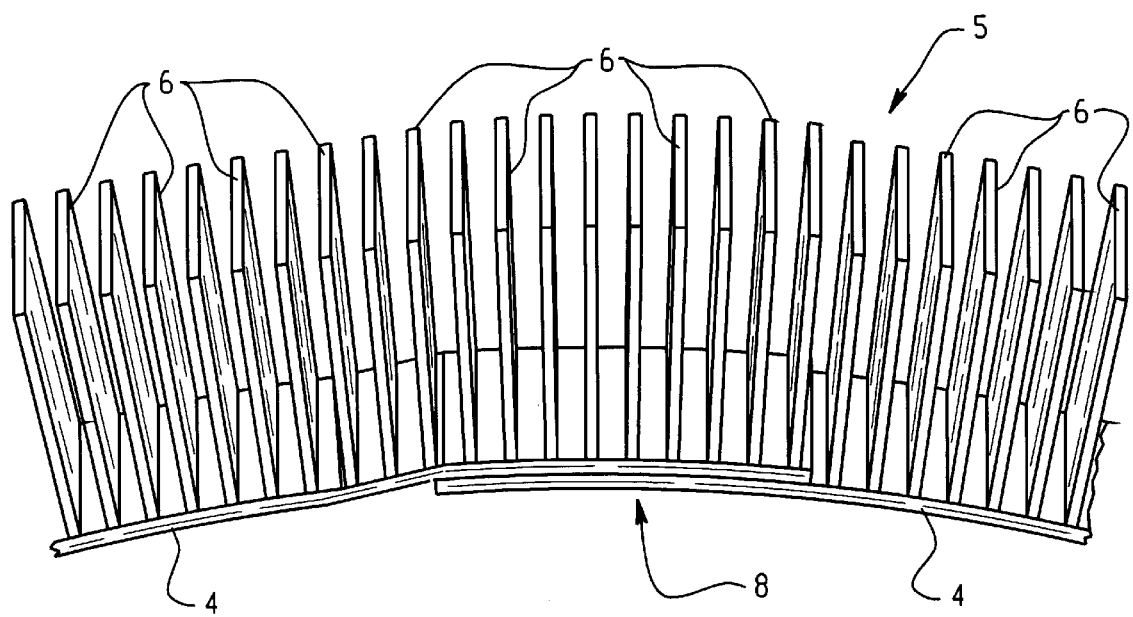
FIG. 2 is an enlarged view of the sound-absorbing assembly of FIG. 1.

FIG. 2 depicts an enlarged view of the sound-absorbing assembly in accordance with FIG. 1.

The support fabric 4 which is depicted here consists of a web 5 of polyester fibers (6) with the formation of an overlapping area 8. The support fabric 4 is, for this purpose, freed from the web 5 of fibers 6 on one side, along with length of the overlapping area 8, through which the ends of the support fabric 4 can be glued to one another. Although not shown in the drawings, the support fabric 4 could also be glued to the rim.

In an additional embodiment of the sound-absorbing assembly not shown in the drawings, the support fabric consists of fibers of moisture-shrinkable polyvinyl-alcohol (PVA), through which a very simple mounting of the support fabric, without adhesions, overlappings, etc., is brought about. The ring of support fabric is, for this purpose, slid over the horns of the rim and then moistened, after which it shrinks and is tightened to the rim in a suitable position.

Figure 3:
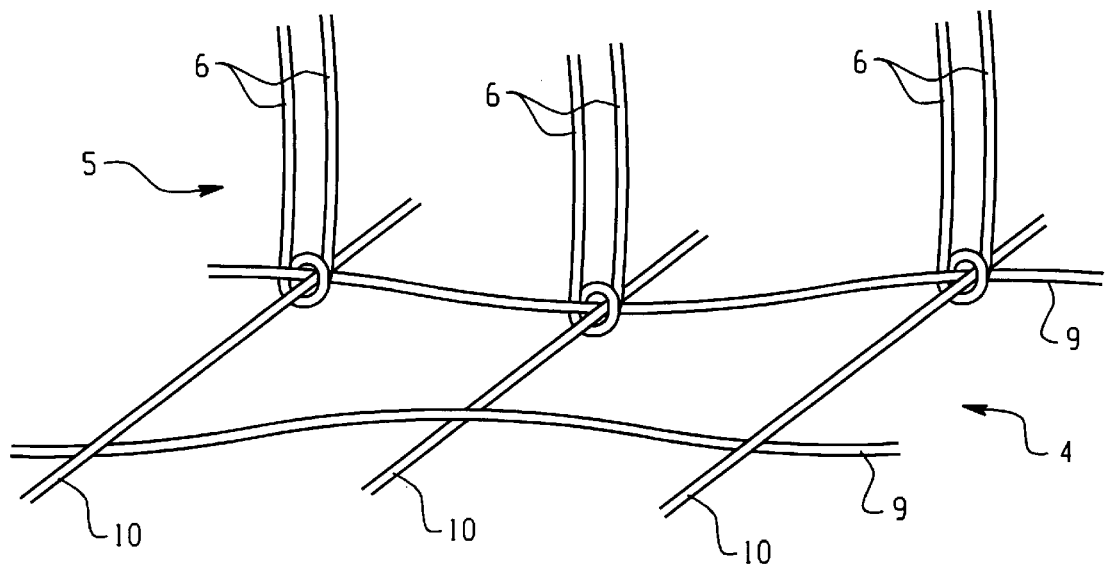
FIG. 3 illustrates one possible construction of a support fabric and web fibers of the sound-absorbing assembly of FIG. 1.

FIG. 3 depicts one possible formation of the support fabric 4 and the fibers 6 of the web 5, in a sound-absorbing assembly in accordance with FIGS. 1 and 2, whereby the fibers 9, 10 of the support fabric 4 are interwoven or interlaced with one another in the form of warp and woof, and the flexible and non-self-supporting fibers 6 of the web 5 are attached, within the support fabric 4, by means of loops. The distances between the woof fibers 9 and the warp fibers 10, as well as the materials of the same, can hereby be varied in order to adjust the strength of the fabric support 4.

Figure 4:
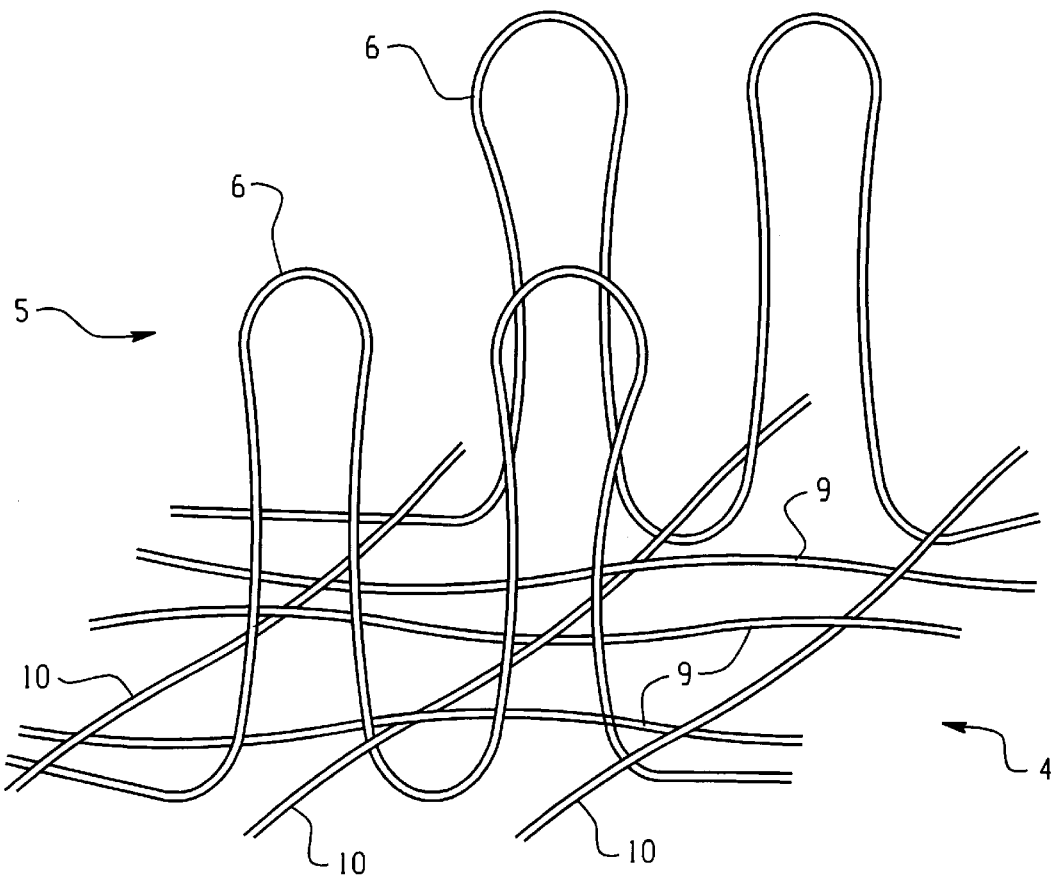
FIG. 4 illustrates another possible construction of a support fabric and web fibers within a sound-absorbing assembly of FIG. 1.

FIG. 4 depicts one additional possible formation of the support fabric 4 and the fibers 6 of the web 5 in a sound-absorbing assembly in accordance with FIGS. 1 and 2, whereby the fibers 9, 10 of the support fabric 4 are, in turn, interwoven or interlaced with one another in the form of warp and woof, and the flexible and non-self-supporting fibers 6 of the web 5 are attached, as a continuous "endless" fiber, inside the support fabric 4. As shown in FIG. 4, these endless fibers form fiber loops which extend from support fabric 4 in the radial direction of the tire. The number of, and the distances between, the woof fiber 9 and the warp fibers 10, as well as the materials of the same, can hereby be varied in order to adjust the strength of the fabric support 4.

Figure 5:
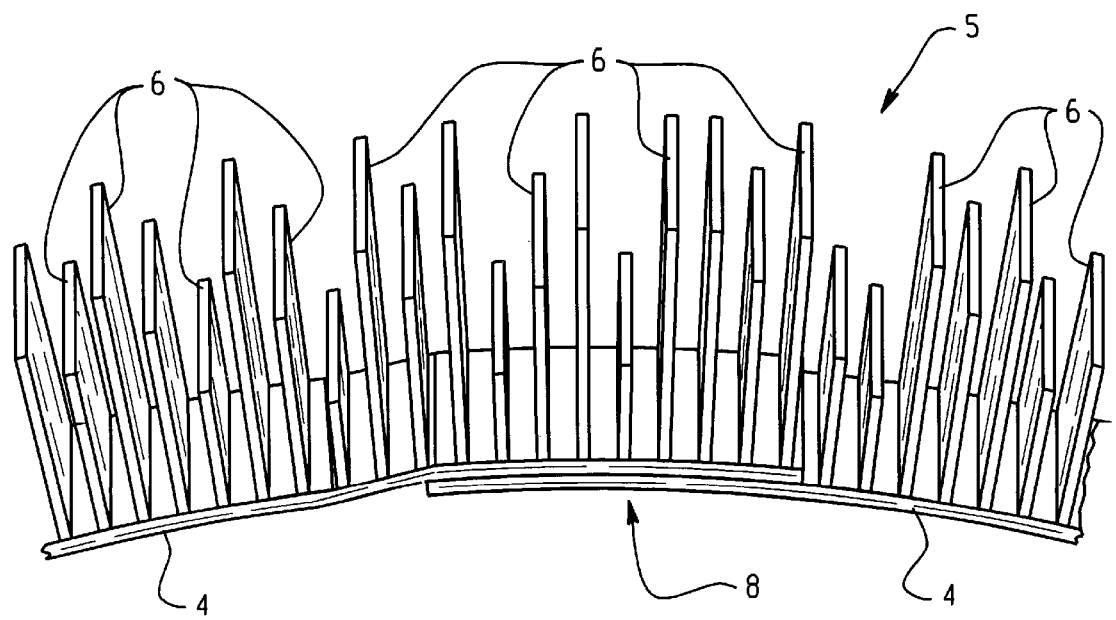
FIG. 5 is an enlarged view of another possible construction of the sound-absorbing assembly of FIG. 1.

FIG. 5 depicts an enlarged view of another possible construction of the sound-absorbing assembly of FIG. 1. In this construction, the fibers 6 have different lengths in different discrete areas over the length of the support fabric 4.

The present invention solves the so-called tire "acoustic cavity noise" problem, which occurs in certain tire/vehicle applications. In an automotive pneumatic tire, primarily the pressure of the air inside the tire carries the loads of the vehicle. This applies not only to the static vehicle weight, but also to all the dynamic (or high frequency) interaction loads when the vehicle travels on the road. The spectrum of the forces at the tire contact patch covers a wide frequency range. These high frequency forces are all transferred to the tire rim (and to the vehicle wheel spindle) through the primary path of the pressure fluctuations of the air inside the tire. The dynamic characteristics of the tire acoustic cavity play an important role in the road to vehicle force transfer process. Pressure wave "resonances" in the tire acoustic cavity, which typically occur in the 200 to 300 Hertz (Hz) frequency range, facilitate the force transfer, creating peaks in the noise spectrum inside the tire and consequently inside the vehicle. These tire acoustic cavity resonance noise peaks can be detected by measuring the noise inside the vehicle. These amplitude peaks become annoying pure tones which can detract from the vehicle interior sound quality. The inventive sound absorber solves this problem by absorbing this concentrated sound energy where it is produced, namely, at the acoustic cavity inside the tire.

The inventive sound absorber removes resonant energy from the sound field inside the tire by absorption and, as such, it is not frequency selective. It will remove the high-intensity components regardless at what frequency they occur. This is accomplished in the invention because the synthetic hair fibers of the inventive absorber, which resemble artificial fur, are exposed to the sound field inside the tire and remove energy by absorption. The absorbing strip (typically 1" to 4" wide) is located at the bottom of the wheel well and normally covers all its length. The length of this strip is conventionally about 1" to 2" longer than the circumference of the wheel well bottom to allow for an "overlap joint" (see FIG. 2). The artificial hairs have been removed from one end of the strip in this embodiment to facilitate the building of a strong overlap joint by gluing the two ends together or by any other means. If necessary, the whole length of the strip can also be glued to the bottom of the wheel well to contain the centrifugal force on the strip as the tire rotates in its application of carrying the vehicle. The centrifugal force field makes the artificial hairs on one side of the strip stand up on end toward the inside of the tire cavity. In this way, these hairs interact with the resonant waves in the acoustic cavity, removing energy and reducing the peak intensity of the noise inside the tire and inside the vehicle. The annoying pure tone component produced by the tire acoustic cavity resonance can thus be eliminated from the vehicle interior noise.

The decisive difference between the inventive sound absorber, which uses synthetic hair material to absorb sound, and other materials such as foams, is that the inventive sound absorber (resembling an artificial fur) is very light. This is important in controlling the effects of the centrifugal force field created as the tire rotates in its operation in the vehicle. This light strip reduces the gluing or clamping requirements in forming the overlap joint of the necessary strength, as well as the gluing to the wheel if required. The strip with the synthetic hairs on one side is very thin and, as opposed to foam, does not interfere with the normal mounting of the tire on the wheel because the synthetic hairs are lying on their side and are very flexible. As the tire operates and a centrifugal force field is created by the rotation, the flexible synthetic hairs stand up in the radial direction to their total length (typically 1" to 2") into the acoustic cavity, removing resonant energy from the sound field.

Furthermore, the location of the inventive absorber in the acoustic cavity on the wheel rim, instead of on the tire inside surface prevents interference with the dissipation of heat by the tire and as such does not interfere at all with the tire performance and durability. The inventive absorber only reduces the resonant peaks of the noise inside the tire, thus preventing these annoying peaks from showing up in the vehicle interior noise. Gluing the strip to the wheel might also remove energy from high-frequency vibrations of the wheel in case that one of the wheel vibration modes, the so-called "potato chip mode", happens to resonate in the same frequency range as the acoustic cavity. In this case, the inventive absorber will also reduce the coupling between the tire acoustic cavity resonance and a wheel mode resonance. This might alleviate a situation when there is a vehicle noise problem, compounded by tire acoustic cavity noise aligning with a wheel mode resonance and the vehicle passenger compartment is "sensitive" to that frequency.

We claim:

1. A sound absorber for insertion into a pneumatic tire mounted on a rim of a wheel, the pneumatic tire having side walls and a running surface and defining together with the rim of the wheel a toroidal space inside the tire, the sound absorber comprising a support strip in the form of a closed ring having an inside surface for mounting on the rim and an outside surface for facing the toroidal space inside the pneumatic tire, and a system of flexible fibers attached to the outside surface of the strip and extending no more than halfway into the toroidal space in a radial direction when the tire is rotated.

2. The sound absorber of claim 1, wherein the fibers are non self-supporting.

3. The sound absorber of claim 1, wherein the fibers are attached on one end to the strip, with the remainder of the fiber being unattached to the strip or to the other fibers.

4. The sound absorber of claim 1, wherein the fibers are arranged in bundles of individual fibers.

5. The sound absorber of claim 1, wherein the support strip is formed from a fabric.

6. The sound absorber of claim 5, wherein the fabric is formed from interwoven filaments.

7. The sound absorber of claim 6, wherein the fibers of the fiber system are looped around these interwoven filaments.

8. The sound absorber of claim 7, wherein the fibers are looped a single time about the filaments of the support strip, the looped fibers defining two free ends extending in the radial direction of the tire.

9. The sound absorber of claim 7, wherein the fibers of fiber system are formed from continuous fibers repeatedly interlaced around the filaments of the support strip in such a way as to form multiple fiber loops extending in the radial direction of the tire.

10. The sound absorber of claim 1, wherein the fibers of the fiber system are formed from a synthetic material.

11. The sound absorber of claim 1, wherein the support strip is made from a synthetic fabric.

12. The sound absorber of claim 1, wherein the support strip is made from a shrinkable material.

13. The sound absorber of claim 1, wherein the support strip is provided on at least one side with a sound dampening material.

14. The sound absorber of claim 1, wherein the fibers have different lengths in different discrete areas over the length of the support strip.

15. A motor vehicle wheel assembly comprising a wheel defining a rim, a pneumatic tire mounted on the rim, the pneumatic tire having side walls and a running surface and defining together with the rim a toroidal space inside the tire, and a support strip having an inside surface mounted on the rim of the wheel and an outside surface for facing the toroidal space inside the pneumatic tire, and a system of flexible fibers attached to the outside surface of the strip and extending no more than halfway into the toroidal space in the radial direction of the tire to absorb sound in the tire.

16. The wheel assembly of claim 15, wherein the support strip is in the form of a closed ring completely encircling the rim of the wheel.

17. The sound absorber of claim 1, wherein the system of flexible fibers extends approximately one to two inches into the toroidal space in the radial direction of the tire.

18. The wheel assembly of claim 15, wherein the system of flexible fibers extends approximately one to two inches into the toroidal space in the radial direction of the tire.

* * * * *